United States Patent
Sunaga et al.

(10) Patent No.: US 9,511,797 B2
(45) Date of Patent: Dec. 6, 2016

(54) INTEGRAL POWER STEERING DEVICE

(71) Applicant: HITACHI AUTOMOTIVE SYSTEMS STEERING, LTD., Hiki-gun, Saitama (JP)

(72) Inventors: Sosuke Sunaga, Higashimatsuyama (JP); Shogo Ishikawa, Saitama (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/760,124

(22) PCT Filed: Dec. 27, 2013

(86) PCT No.: PCT/JP2013/085060
§ 371 (c)(1),
(2) Date: Jul. 9, 2015

(87) PCT Pub. No.: WO2014/115483
PCT Pub. Date: Jul. 31, 2014

(65) Prior Publication Data
US 2015/0353129 A1  Dec. 10, 2015

(30) Foreign Application Priority Data
Jan. 23, 2013  (JP) .................. 2013-009695

(51) Int. Cl.
| | |
|---|---|
| B62D 5/06 | (2006.01) |
| B62D 5/22 | (2006.01) |
| B62D 5/083 | (2006.01) |
| B62D 5/07 | (2006.01) |
| B62D 5/087 | (2006.01) |
| B62D 5/12 | (2006.01) |
| B62D 5/24 | (2006.01) |
| F16K 31/48 | (2006.01) |

(52) U.S. Cl.
CPC .............. *B62D 5/22* (2013.01); *B62D 5/061* (2013.01); *B62D 5/07* (2013.01); *B62D 5/083* (2013.01); *B62D 5/087* (2013.01); *B62D 5/12* (2013.01); *B62D 5/24* (2013.01); *F16K 31/48* (2013.01)

(58) Field of Classification Search
CPC ........... B62D 5/22; B62D 5/24; B62D 5/12; B62D 5/083
See application file for complete search history.

(56) References Cited

U.S. PATENT DOCUMENTS

| | | | | |
|---|---|---|---|---|
| 3,896,703 | A | * 7/1975 | Bertanza | B62D 5/061 91/375 A |
| 4,293,673 | A | * 10/1981 | Hamer | C08F 10/02 502/112 |
| 4,367,672 | A | 1/1983 | Eiser | |
| 4,942,803 | A | * 7/1990 | Rabe | B62D 5/083 137/625.24 |
| 5,419,235 | A | 5/1995 | Gilbert et al. | |

(Continued)

FOREIGN PATENT DOCUMENTS

| | | |
|---|---|---|
| JP | 56-021971 A | 2/1981 |
| JP | 2005-022636 A | 1/2005 |
| JP | 2012-2011394 A | 10/2012 |

*Primary Examiner* — Tony Winner
(74) *Attorney, Agent, or Firm* — Foley & Lardner LLP

(57) ABSTRACT

A first valve accommodation hole is provided in a valve housing. A first valve element, a first valve seat member, a first coil spring, and a first pin are directly accommodated and disposed in the first valve accommodation hole. It is thereby possible to reduce the maximum diameter t1 of the first valve accommodation hole, thus reducing the size of a housing main body.

20 Claims, 6 Drawing Sheets

(56) References Cited

U.S. PATENT DOCUMENTS

| | | |
|---|---|---|
| 6,896,093 B2 | 5/2005 | Ishikawa et al. |
| 8,596,407 B2 | 12/2013 | Ishikawa et al. |
| 2003/0141140 A1* | 7/2003 | Wienecke ............ B62D 5/083 180/441 |
| 2004/0251075 A1 | 12/2004 | Ishikawa et al. |
| 2008/0093155 A1* | 4/2008 | Ishikawa .............. B62D 15/025 180/426 |
| 2012/0241242 A1 | 9/2012 | Ishikawa et al. |

* cited by examiner

INTEGRAL POWER STEERING DEVICE

TECHNICAL FIELD

The present invention relates to an integral power steering device applicable to comparatively large-sized vehicles, and specifically to an integral power steering device equipped with a stroke limiter for limiting a piston stroke.

BACKGROUND ART

For instance, one such generally-known integral power steering device has been disclosed in Patent document 1.

That is, this type of integral power steering device is mainly comprised of a housing main body constructed by a substantially cylindrical bottomed gear housing and a valve housing that closes the opening of the gear housing, a power cylinder configured to partition the internal space of the gear housing into two pressure chambers by a piston linked to a steering shaft for generating a steering assist torque, and a rotary valve disposed in the valve housing and configured to selectively supply appropriate hydraulic pressure required for generating the above-mentioned steering assist torque to each of the pressure chambers of the power cylinder depending on the steering direction and steering torque. A pair of valves, namely a first valve and a second valve, each serving as a stroke limiter for restricting a stroke position of the piston, are provided so as to face the respective pressure chambers, namely the first pressure chamber and the second pressure chamber.

The first valve and the second valve are configured such that their valve bodies are accommodated and disposed in respective valve accommodation holes formed in the housings, and that their valve elements are slidably fitted on the inner peripheral side of each of the valve bodies. When the hydraulic pressure in each of the pressure chambers reaches a pressure level greater than or equal to a predetermined value, pin members, which are linked to the respective valve elements, are pushed or forced toy means of the piston, and thus the valves are opened. Hence, fluid-communication between the pressure chambers is established, and as a result an excessive rise in hydraulic pressure in each of the pressure chambers can be suppressed.

CITATION LIST

Patent Literature

Patent document 1: Japanese patent provisional publication No. 2005-022636 (A)

SUMMARY OF INVENTION

Technical Problem

However, the previously-discussed prior-art integral power steering device is configured such that the valve element and the like are accommodated and disposed in each of the housings through the use of the valve body. The valve body and the valve element and the like are configured to be overlapped with each other in the radial direction. Thus, regarding the valves, the diameters of their respective valve accommodation holes have to be undesirably enlarged.

As a result of this, in particular regarding the first valve, owing to the rotary valve placed at the central portion of the inner peripheral side of the valve housing, it is difficult to arrange the first valve closer to the inner peripheral side. This leads to the drawback of enlargement of the valve housing, consequently, enlargement of the housing main body.

Additionally, regarding the first valve, its valve accommodation hole is formed obliquely with respect to the axis of the steering shaft, thus enlarging the area occupied by the valve accommodation hole in the radial direction of the valve housing. This also leads to the drawback of enlargement of the valve housing.

It is, therefore, in view of the previously-described drawbacks of the prior art, an object of the invention to provide an integral power steering device capable of reducing the size of a housing main body.

Solution to Problem

According to one aspect of the invention, especially, at least a first valve, which is disposed on the side of a valve housing, is comprised of a first valve accommodation hole formed by machining the valve housing itself, a first valve seat portion disposed in the first valve accommodation hole and arranged on the side of a first pressure chamber and having a first pin insertion hole axially formed through the first valve seat portion, a first valve element arranged to be opposed to the first valve seat portion and installed to axially slide in the first valve accommodation hole and configured to cut off a movement (a flow) of working oil from the second pressure chamber side to the first pressure chamber side with the first valve element seated on the first valve seat portion, a first pin portion integrally connected to the first valve element and configured to face an internal space of the first pressure chamber through the first pin insertion hole and to apply a moving force to the first valve element by pushing the first pin portion by a piston immediately when a first predetermined stroke position of the piston has been reached, and a first biasing member configured to bias the first valve element toward the first valve seat portion.

According to another aspect of the invention, especially, at least a first valve, which is disposed on the side of a valve housing, is comprised of a first valve accommodation hole provided in the valve housing and configured to be substantially conformable to a direction of movement of a piston, a first valve seat portion disposed in the first valve accommodation hole and arranged on the side of a first pressure chamber and having a first pin insertion hole axially formed through the first valve seat portion, a first valve element arranged to be opposed to the first valve seat portion and installed to axially slide in the first valve accommodation hole and configured to cut off a movement (a flow) of working oil from the second pressure chamber side to the first pressure chamber side with the first valve element seated on the first valve seat portion, a first pin portion integrally connected to the first valve element and configured to face an internal space the first pressure chamber through the first pin insertion hole and to apply a moving force to the first valve element by pushing the first pin portion by the piston immediately when a first predetermined strobe position of the piston has been reached, and a first biasing member configured to bias the first valve element toward the first valve seat portion.

Advantageous Effects of Invention

In one aspect of the invention, the first valve element, which constructs part of the first valve, is provided directly in the first valve accommodation hole. Therefore, it is possible to set the radial dimension of the first valve accommodation hole smaller, as compared to the prior-art device in which the valve body and the valve element are configured in the valve housing so as to be overlapped with each other in the radial direction. Hence, it is possible to arrange the first valve accommodation hole closer to the side of a rotary valve. As a result of this, it is possible to downsize the valve housing (the housing main body).

In another aspect of the invention, the first valve is arranged substantially parallel to the axis of the steering shaft.

Therefore, it is possible to reduce the area occupied by the first valve accommodation hole in the radial direction of the valve housing. Hence, it is possible to arrange the first valve accommodation hole in close proximity to the side of the rotary valve. As a result of this, it is possible to downsize the valve housing (the housing main body).

DESCRIPTION OF EMBODIMENTS

First Embodiment

The embodiments of the integral power steering device according to the invention are hereinafter described in detail with reference to the drawings. By the way, in the respective embodiments, the integral power steering device is exemplified in an automotive power steering device.

Figure 1:
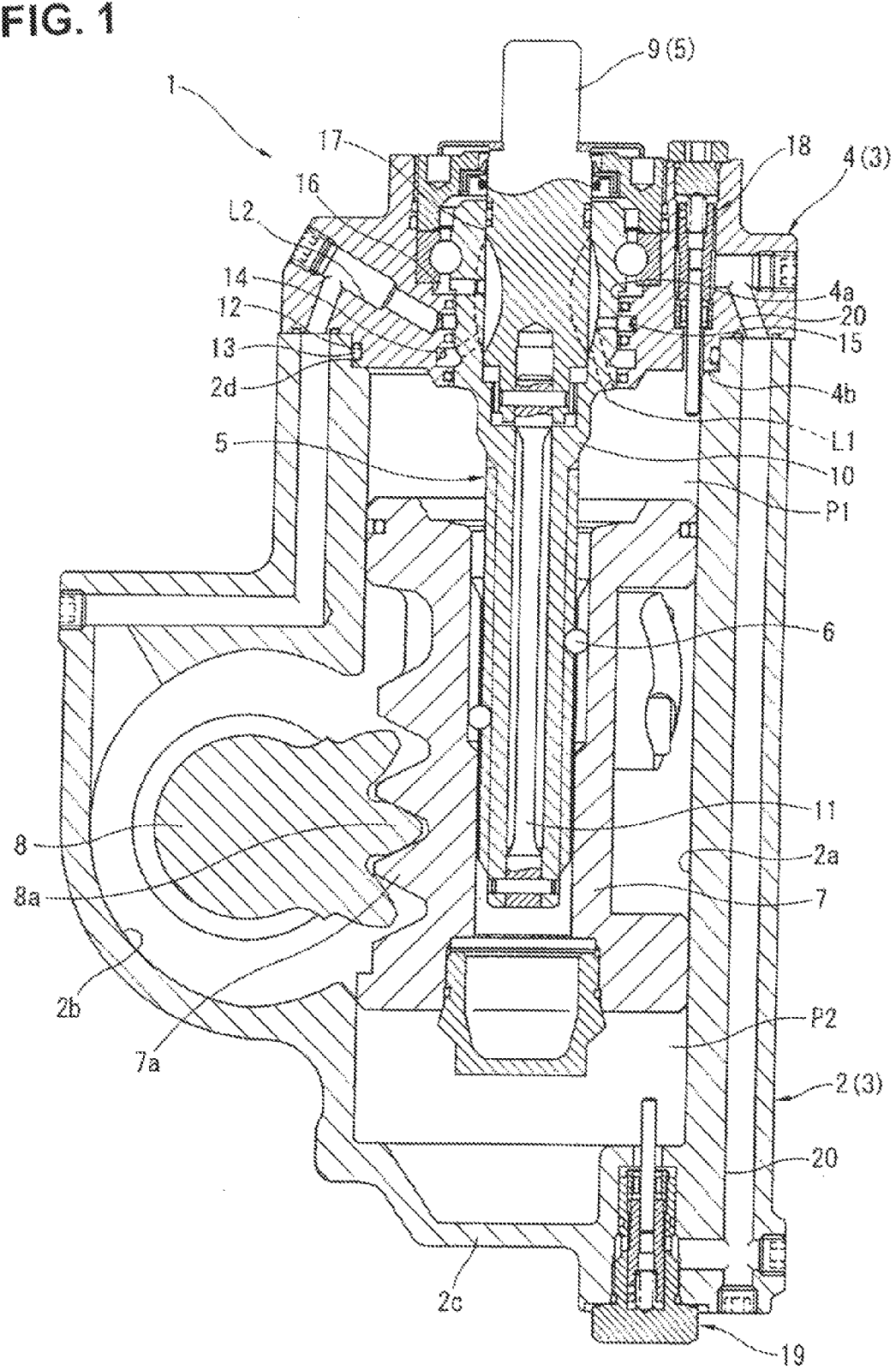
FIG. 1 is a longitudinal cross-sectional view illustrating a first embodiment of an integral power steering device according to the invention.

As shown in FIG. 1, the integral power steering device 1 of the embodiment has a substantially cylindrical bottomed gear housing 2 formed with a cylinder section 2a therein, a valve housing 4 configured to close one opening end of cylinder section 2a and to form or construct a housing main body 3 (a housing) together with the gear housing 2, a steering shaft 5 rotatably supported at one end on the inner periphery of valve housing 4, the other end of the steering shaft being configured to be inserted and disposed in the cylinder section 2a, a piston 7 installed to axially move on the outer periphery of the other end of steering shaft 5 through a ball-screw mechanism 6 serving as a first motion converter and slidably accommodated in the cylinder section 2a so as to partition the internal space of gear housing 2 into a first pressure chamber P1 and a second pressure chamber P2, and a sector shaft 8 linked at one end to the piston 7 through a second motion converter and configured to turn with an axial movement of piston 7 for turning steered road wheels via a pitman arm (not shown).

The aforementioned steering shaft 5 is constructed by an input shaft 9 linked at one end to a steering wheel (not shown) and rotatably supported at the other end on the valve housing 4, and an output shaft 10 arranged on the axis of input shaft 9 and configured to overlap at one end with the outer periphery of input shaft 9 and linked at the other end to the piston 7, the input shaft and the output shaft being relatively rotatably connected to each other via a torsion bar 11.

The aforementioned piston 7 is linked to the output shaft 10 through the ball-screw mechanism 6 such that the piston is axially displaced by rotation of output shaft 10. Also, piston 7 is formed on one side face with a rack gear 7a (a toothed portion). The rack gear 7a is configured to be in meshed-engagement with a sector gear 8a attached to one end of sector shaft 8. That is, the previously-discussed second motion converter is constructed by the gears 7a, 8a. By virtue of the second motion converter, axial movement of piston 7 is converted into rotary motion of sector shaft 8.

The aforementioned gear housing 2 is formed of a metallic material, and has a sector gear accommodation section 2b in addition to the cylinder section 2a. The sector gear accommodation section is configured perpendicularly to the cylinder section 2a and formed integral with the cylinder section so as to communicate with the cylinder section 2a.

The aforementioned valve housing 4 is formed of a metallic material. The valve housing has a rotary valve accommodation, portion 4a (a shaft insertion hole) axially formed through the valve housing. The other end of input shaft 9 and the one end of output shaft 10 are accommodated in the rotary valve accommodation portion 4a such that these two ends are overlapped with each other in the radial direction, and that a rotary valve 17 is configured by the overlapped sections of input shaft 9 and output shaft 10.

Also, the inside end of valve housing 4, which is accommodated in the cylinder section 2a, is configured as a stepped, reduced-diameter fitting protrusion 4b. On the other hand, the opening end of cylinder section 2a is formed with a stepped, enlarged-diameter fitting recess 2d. The opening end of cylinder section 2a is closed by the valve housing 4 by recess-and-protrusion fitting of the fitting protrusion 4b and the fitting recess 2d. By the way, an annular retaining groove 12 is formed in the outer peripheral surface of fitting protrusion 4b and used to hold or retain a seal ring 13 in the retaining groove 12.

Also provided around the rotary valve 17 are an inlet port (IN port) 14 configured to communicate with an oil pump (not shown) serving as a hydraulic pressure source, a supply-and-drain port 15 configured to supply and drain hydraulic pressure (working oil), introduced from the IN port 14, to and from each of pressure chambers P1, P2, and an outlet port (OUT port) 16 configured to drain working oil discharged from each of pressure chambers P1, P2 through the supply-and-drain port 15 into a reservoir tank (not shown). Also, supply-and-drain port 15 communicates with the first pressure chamber P1 through a first hydraulic oil line L1 formed in the output shaft 10, and also communicates with the second pressure chamber P2 through a second hydraulic oil line L2 and the like formed in the gear housing 2.

With the previously-discussed configuration, when the steering wheel is turned, switching operation of rotary valve 17 occurs depending on the rotation direction of the steering wheel, such that hydraulic pressure of working oil discharged from the oil pump is selectively supplied to one of the first pressure chamber P1 and the second pressure chamber P2 and that the other of the first and second pressure chambers is communicated with the reservoir tank for applying a moving force (a motive power) to the piston 7 by the differential pressure between the pressure chambers P1, P2.

A first valve 18, which serves as a stroke limiter for limiting or restricting a stroke amount of one end of piston 7, is located on the outer periphery of the rotary valve accommodation portion 4a of valve housing 4 of housing main body 3 and provided at a position opposed to the piston head on the one end of piston 7. On the other hand, a second valve 19, which serves as a stroke limiter for limiting or restricting a stroke amount of the other end of piston 7, is located at the bottom 2c of gear housing 2 of the housing main body and provided at a position opposed to the piston head of the other end of piston 7. The first and second valves 18, 19 are connected to each other through a communication, passage 20 bored and configured to extend over the gear housing 2 and the valve housing 4.

Figure 2:
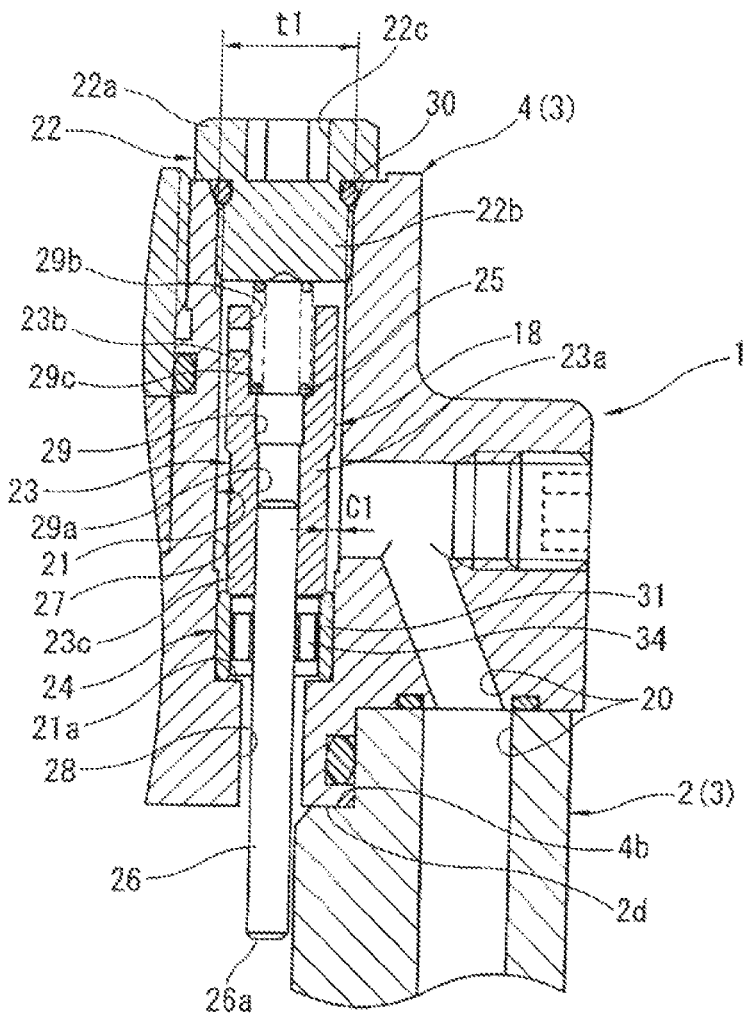
FIG. 2 is an enlarged cross-sectional view illustrating the essential part around the first valve shown in FIG. 1.

As shown in FIG. 2, the first valve 18 is comprised of a first valve accommodation hole 21, a sealing plug 22, a first valve element 23, a first valve seat member 24 (a first valve seat portion), a first coil spring 25, and a first pin 26 (a first pin portion). The first valve accommodation hole 21 is bored in the valve housing 4. One end (the lower end in FIGS. 1-2) of the first valve accommodation hole 21 is configured to communicate with the first pressure chamber P1. The sealing plug 22 is configured to close the other end of the first valve accommodation hole 21. The first valve element 23 is disposed in the first valve accommodation hole 21 and slidably fitted on the inner peripheral surface of the first valve accommodation hole 21. The first valve seat member 24 is fixedly connected at the one end of the first valve accommodation hole 21, whereas the first coil spring 25 is disposed in the other end of the first valve accommodation hole 21 in a manner so as to sandwich the first valve element 23 between them. The first coil spring 25 serves as a first biasing member for biasing the first valve element 23 toward the first valve seat member 24. The first pin 26 is fixedly connected at one end to the first valve element 23. The other end of the first pin is configured to face the internal space of the first pressure chamber P1.

The aforementioned first valve accommodation hole 21 is comprised of a first large-diameter portion 2 (a large-diameter portion) in which the first valve element 23 and the first valve seat member 24 are accommodated, and a first small-diameter portion 23 (a small-diameter portion) whose diameter is reduced from the first large-diameter portion 27 toward the first pressure chamber P1 and in which the first pin 26 is inserted. The first valve seat member 24 is configured and installed to abut on a stepped portion 21a defined between the first large-diameter portion 27 and the first small-diameter portion 28. The axis of the first valve accommodation hole 21 is arranged and set substantially parallel to the axis of the steering shaft 5. By the way, the first valve accommodation hole 21 is formed by machining, such as drilling, from the side of the first large-diameter portion 27, and then it is possible to easily form the stepped portion 21a.

The aforementioned first valve element 23 is comprised of a email-diameter cylindrical hollow portion 23a and a large-diameter cylindrical hollow portion 23b. The small-diameter cylindrical hollow portion 21a is configured on the side of one end of the first valve element, corresponding to the side of the first valve seat member 24. The diameter of small-diameter cylindrical hollow portion 23a is dimensioned to be slightly less than the inside diameter of the first large-diameter portion 27. The large-diameter cylindrical hollow portion 23b is configured on the side of the other end of the first valve element. The large-diameter cylindrical hollow portion is configured such that its outer peripheral surface is kept in sliding-contact with the inner peripheral surface of the first large-diameter portion 27. A series of axial through holes 29 is formed in these cylindrical hollow portions. With the previously-discussed configuration, particularly by virtue of the large-diameter cylindrical hollow portion 23b, the attitude of the sliding first valve element 23 in the first large-diameter portion 27 can be stabilized. Additionally, a flow path C1, through which working oil passes, is defined between the outer periphery of small-diameter cylindrical hollow portion 23a and the inner peripheral surface of the first large-diameter portion 27.

The aforementioned series of through holes 29 is configured, such that the inner peripheral side of small-diameter cylindrical hollow portion 23a is formed as a small-diameter hole 29a whose inside diameter is set less than the outside diameter of the first pin 26 and to which the one end of the first pin 26 is press-fitted and fixed, and that the inner peripheral side of large-diameter cylindrical hollow portion 23b is formed as a large-diameter hole 29b having an inside diameter greater than the small-diameter hole 29a. The innermost end of large diameter hole 29b is formed with a spring seat portion 29c on which the first coil spring 25 is seated.

With the previously-discussed configuration, the first coil spring 25 is accommodated and retained in the first valve accommodation hole 21, such that one end of the first coil spring, facing the first pressure chamber P1, is seated on the spring seat portion 29c, whereas the other end is seated on the inside end face of the sealing plug 22.

The aforementioned sealing plug 22 has a large-diameter portion 22a exposed to the outside of the housing and a small-diameter portion 22b whose outside diameter is dimensioned less than the large-diameter portion 22a. A male-screw threaded portion formed on the outer periphery of small-diameter portion 22b is screwed to a female-screw threaded portion formed on the inner periphery of the first large-diameter portion 27. In this manner, the sealing plug 22 provides a sealing function, and also serves as a seating surface for the first coil spring 25. This contributes to reduced number of parts.

The large-diameter portion 22a has an engaging portion 22c, which is recessed substantially in the center position of the outside end face of the large-diameter portion, and with which a tool (concretely, a hexagonal wrench) for attaching or detaching the sealing plug 22 is brought into engagement. By the way, a seal ring 30 is fitted onto the outer periphery of the root of small-diameter portion 22b. Hence, the inside and the outside of the first valve accommodation hole 21 are sealed in a fluid-tight fashion by means of the seal ring 30.

Figure 3A:
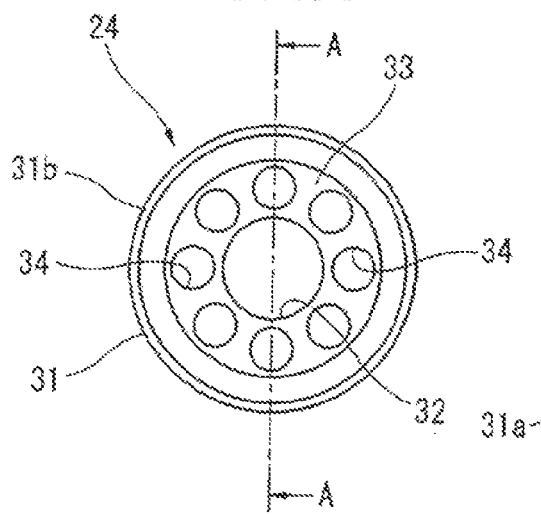
FIG. 3 is a drawing illustrating the first valve seat member itself shown in FIG. 2, FIG. 3A being a plan view of the first valve seat member, whereas FIG. 3B being a cross-sectional view taken along the line A-A of FIG. 3A.
Figure 3B:
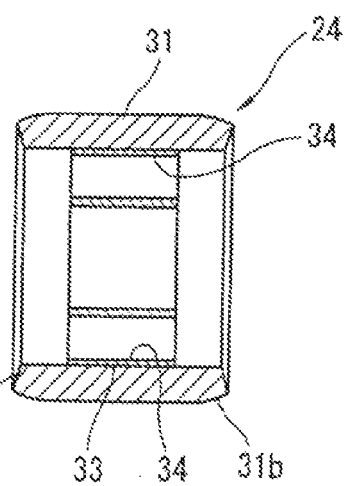

As shown in FIG. 3, the aforementioned first valve seat member 24 is comprised of a cylindrical first seat member 31 on which the first valve element 23 is seated and a cylindrical first guide member 33 installed on the inner peripheral surface of the first seat member 31 and having a central guide hole 32 (a first pin insertion hole) axially formed through the first guide member.

The aforementioned first seat member 31 is configured such that its outside diameter is dimensioned to be greater than the small-diameter cylindrical hollow portion 23a and its inside diameter is dimensioned to be slightly less than the large-diameter cylindrical hollow portion 23b. The first seat member is press-fitted into the innermost end of the first large-diameter portion 27. Also, the first seat member 31 is configured such, that a substantially center of both axial ends of the first seat member is somewhat enlarged in the radial direction. Concretely, the first seat member is configured to have an inner peripheral tapered portion 31a formed on the inner peripheral part of each of the axial ends and an outer peripheral tapered portion 31b formed on the outer peripheral part of each of the axial ends. Of these tapered portions 31a, 31b, the inner peripheral tapered portion 31a, facing the first valve element 23, serves as a seating surface on which the tip 23c of small-diameter cylindrical hollow portion 23a abuts. On the other hand, the axial end of the first seat member 31, facing the first pressure chamber P1, abuts on the stepped portion 21a, and additionally its outer peripheral tapered portion 31b contributes to the improved insertion workability when the first valve seat member 24 is inserted and installed into the first valve accommodation hole 21.

The aforementioned first guide member 33 is configured such that its axial length is dimensioned to be less than the first seat member 31. In addition to the axial guide hole 32, the first guide member 33 is formed with a plurality of circumferentially equidistant-spaced introduction holes 34 located around the guide hole 32. By the provision of the introduction holes, a flow of working oil through these introduction holes 34 is permitted when the first valve 18 is opened.

As shown in FIG. 2, the first pin 26 is formed into a rod shape, and slidably supported by the first guide member 33. A prescribed protrusion amount of the first pin 26 is set to such amount as to permit the center of the top end face 26a of the first pin to be brought into abutted-engagement with the piston head on the one end of piston 7 shown in FIG. 1 at a permissible stroke limit of piston 7 (i.e., at the first predetermined stroke position).

Figure 4A:
FIG. 4 is a drawing illustrating the shape of the tip of the first pin shown in FIG. 2, FIG. 4A being a partial view illustrating a flat-faced end of the pin exemplified in the first embodiment, FIG. 4B being a partial view illustrating a dome-shaped hemispherical end largely modified from the flat-faced tip of FIG. 4A, and FIG. 4C being a partial view illustrating a circular-arc shaped end slightly modified from only the flat-faced top end face of FIG. 4A.
Figure 4B:
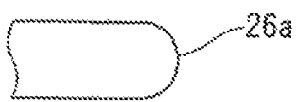
Figure 4C:
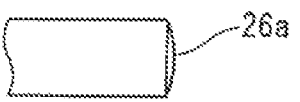

By the way, regarding the shape of the tip (the top end) of the first pin 26, in addition to the flat-faced end shown in FIG. 4A in which the top end face 26a is configured as a flat-faced end and which is exemplified in the shown embodiments, a dome-shape shown in FIG. 4C in which the tip of the first pin is configured as a dome-shaped hemispherical end or a circular-arc shape shown in FIG. 4B in which only the top end face 26a is configured as a circular-arc shaped end may be used or taken into account.

Figure 5:
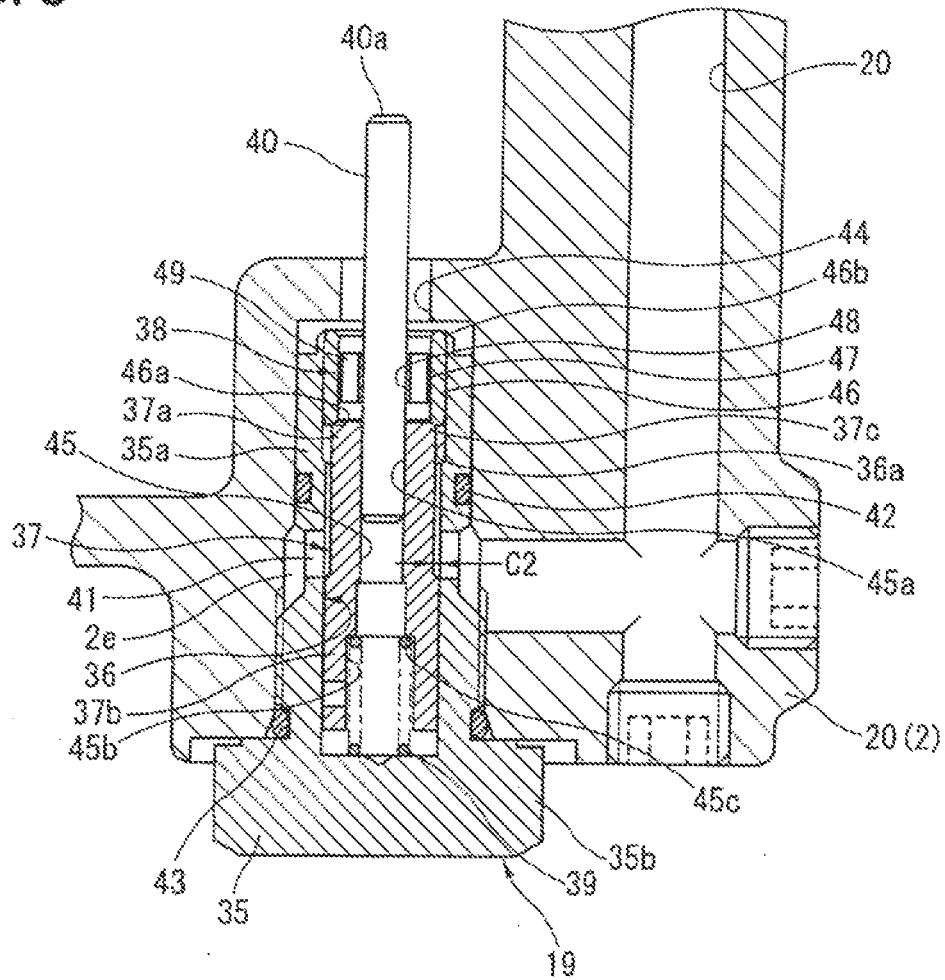
FIG. 5 is an enlarged cross-sectional view illustrating the second valve shown in FIG. 1.

As shown in FIG. 5, the second valve 19 is comprised of a second valve accommodation portion 2e is a cylindrical valve case 35, a second valve accommodation hole 36, a second valve element 37, a second valve seat member 38, a second coil spring 39, and a second pin 40. The second valve accommodation portion 2e is bored in the bottom 2c. The valve case 35 is screwed into the second valve accommodation portion 2e. The second valve accommodation hole 36 is formed inside of the bottom of valve case 35. The second valve element 37 is slidably accommodated in the second valve accommodation hole 36. The second valve seat member 38 is press-fitted and fixed to the opening end of the second valve accommodation hole 36, whereas the second coil spring 39 is disposed in the bottom of the second valve accommodation hole 36 in a manner so as to sandwich the second valve element 37 between them. The second coil spring 39 serves as a second biasing member for biasing the second valve element 37 toward the second valve seat member 38. The second pin 40 is fixedly connected at one end to the second valve element 37. The tip of the other end of the second pin is configured to face the internal space of the second pressure chamber P2.

The aforementioned valve case 35 is comprised of a hollow small-diameter shaft portion 35a in which, the second valve accommodation hole 36 is formed, and a solid large-diameter portion 35b whose diameter is dimensioned larger than the small-diameter shaft portion 35a. Also, a male-screw threaded portion is formed on the outer periphery of the root of small-diameter shaft portion 33a, whereas a female-screw threaded portion is formed on the inner periphery of the outer end of the second valve accommodation portion 2e. Hence, by screwing the male-screw threaded portion into the female-screw threaded portion, the valve case is fixedly installed onto the gear housing 2.

A through hole 41 is formed to radially penetrate an axial intermediate position of the small-diameter shaft portion 35a such, that the inner and outer peripheries of the small-diameter shaft portion are communicated with each other through the through hole. Hence, a flow of working oil through this radial through hole 41 is permitted when the second valve 19 is opened. By the way, a seal ring 42 is fitted onto the outer periphery of the root of small-diameter shaft portion 35a, whereas a seal ring 43 is fitted onto the outer periphery of a substantially axial midpoint of small-diameter shaft portion 35a. Hence, the inside and the outside of the second valve accommodation portion 2e are sealed in a fluid-tight fashion by means of the seal rings 42, 43.

The opening end of the second valve accommodation hole 36 is formed on its inner periphery with an enlarged-diameter valve seat accommodation portion 36a having a diameter greater than part of the second valve accommodation hole in which the second valve element 37 is accommodated. The valve seat accommodation portion 36a is communicated with the second pressure chamber P2 through a small-diameter hole 44 formed through the innermost end wall of valve accommodation portion 2e.

The aforementioned second valve element 37 is comprised of a small-diameter cylindrical hollow portion 37a and a large-diameter cylindrical hollow portion 37b. The small-diameter cylindrical hollow portion 37a is configured on the side of one end of the second valve element, corresponding to the side of the second valve seat member 38. The diameter of small-diameter cylindrical hollow portion 37a is dimensioned to be slightly less than the inside diameter of the second valve accommodation hole 36. The large-diameter cylindrical hollow portion 37b is configured on the side of the other end of the second valve element. The large-diameter cylindrical hollow portion 37b is configured such that its outer peripheral surface is kept in sliding-contact with the inner peripheral surface of the second valve accommodation hole 36. A series of axial through holes 45 is formed in these cylindrical hollow portions. With the previously-discussed configuration, particularly by virtue of the large-diameter cylindrical hollow portion 37b, the attitude of the sliding second valve element 37 in the second valve accommodation hole 36 can be stabilized. Additionally, a flow path C2, through which working oil passes, is defined between the outer periphery of small-diameter cylindrical hollow portion 37a and the inner peripheral surface of the second valve accommodation hole 36.

The aforementioned series of through holes 45 is configured, such that the inner peripheral side of small-diameter cylindrical hollow portion 37a is formed as a small-diameter hole 45a whose inside diameter is set less than the outside diameter of the second pin 40 and to which the one end of the second pin 40 is press-fitted and fixed, and that the inner peripheral side of large-diameter cylindrical hollow portion 37b is formed as a large-diameter hole 45b having an inside diameter greater than the small-diameter hole 45a. The innermost end of large-diameter hole 45b is formed with a spring seat portion 45c on which the second coil spring 39 is seated.

With the previously-discussed configuration, the second coil spring 39 is accommodated and retained in the second valve accommodation hole 36, such that one end of the second coil spring, facing the second pressure chamber P2, is seated on the spring seat portion 45c, whereas the other end is seated on the bottom end face of the inner peripheral side of valve case 35.

The aforementioned second valve seat member 38 is comprised of a cylindrical second seat member 46 on which the second valve element 37 is seated and a cylindrical second guide member 47 installed on the inner peripheral surface of the second seat member 46 and having a central guide hole 48 axially formed through the second guide member.

The aforementioned second seat member 46 is configured such that its outside diameter is dimensioned to be greater than the small-diameter cylindrical hollow portion 37a and its inside diameter is dimensioned to be slightly less than the large-diameter cylindrical hollow portion 37b. The second seat member is accommodated in the second valve accommodation hole 36. Also, the second seat member 46 is configured such that a substantially center of both axial ends of the second seat member is somewhat enlarged in the radial direction. Concretely, the second seat member is configured to have an inner peripheral tapered portion 46a formed on the inner peripheral part of each of the axial ends and an outer peripheral tapered portion 46b formed on the outer peripheral part of each of the axial ends. Of these tapered portions 46a, 46b, the inner peripheral tapered portion 46a, facing the second-valve element 37, serves as a seating surface on which the tip 37c of small-diameter cylindrical hollow portion 37a abuts. Also, the axial end of the second seat member 46, facing the second pressure chamber P2, is fixedly connected to the axial end of valve case 35, facing the second pressure chamber P2, by caulking.

The aforementioned second guide member 47 is configured such that its axial length is dimensioned to be less than the second seat member 46. In addition to the axial guide hole 48, the second guide member 47 is formed with a plurality of circumferentially equidistant-spaced introduction holes 43 located around the guide hole 48. By the provision of the introduction holes, a flow of working oil through these introduction holes 49 is permitted when the second valve 19 is opened.

The second pin 40 is formed into a rod shape, and slidably supported by the second guide member 47. A prescribed protrusion amount of the second pin 40 is set to such amount as to permit the center of the top end face 40a of the second pin to be brought into abutted-engagement with the piston head on the other end of piston 7 shown in FIG. 1 at a permissible stroke limit of piston 7 (i.e., at the second predetermined stroke position).

By the way, regarding the shape of the tip (the top end) of the second pin 40, in a similar manner to the first pin 26 shown in FIG. 4, in addition to the flat-faced end shown in FIG. 4A in which the top end face 40a is configured as a flat-faced end and which is exemplified in the shown embodiments, a dome-shape shown in FIG. 4C in which the tip of the second pin is configured as a dome-shaped hemispherical end or a circular-arc shape shown in FIG. 4B in which only the top end face 40a is configured as a circular-arc shaped end may be used or taken into account.

By the way, the second valve element 37, the second valve seat member 38, the second coil spring 39, and the second pin 40 can be integrally accommodated in the valve case 35 in advance and easily installed into the second valve accommodation portion 2e as a unit (a sub-assembly). This contributes to the improved assembling workability.

The operations of the first valve 18 and the second valve 19 of power steering device 1 are hereunder described in reference to FIGS. 1, 2, and 5.

For instance, when, owing to steering operation made up to an end lock state (a lock end angle) an excessive rise in hydraulic pressure in the second pressure chamber P2 has occurred and thus the hydraulic pressure in the second pressure chamber P2 has exceeded a predetermined pressure value, the second valve element 37 moves downward against the biasing force of the second coil spring 33. Hence, the tip 37c moves apart from the second seat member 46 and thus hydraulic pressure (working oil) in the second pressure chamber P2 is introduced through the introduction holes 49 into the flow path C2. Then, the hydraulic pressure (working oil) flows from the flow path C2 through the through hole 41 and the communication passage 20 toward the side of the first valve 18. Under these conditions, when a further rise in hydraulic pressure in the second pressure chamber P2 occurs, the piston 7 is greatly displaced upward and thus the top end face 26a of the first pin 26 is brought into abutted-engagement with the piston head on the one end of piston 7 and then the first valve element 21 together with the first pin 26 is pushed or thrust in the direction of displacement of piston 7. Hence, the tip 23c of the first valve element moves apart from the first seat member 31. As a result of this, fluid-communication between the first pressure chamber P1 and the second pressure chamber P2 becomes established, and thus working oil in the second pressure chamber P2 is discharged into the first pressure chamber P1. Accordingly, the hydraulic pressure in the second pressure chamber P2 drops, thereby suppressing an excessive rise in hydraulic pressure in the second pressure chamber P2.

On the other hand, when hydraulic pressure in the first pressure chamber P1 has exceeded a predetermined pressure value, the first valve element 23 moves upward against the biasing force of the first coil spring 25. Hence, the tip 23c moves apart from the first seat member 31 and thus working oil in the first pressure chamber P1 is introduced through the introduction holes 34 into the flow path C1. Then, the working oil flows from the flow path C1 through the communication passage 20 toward the side of the second valve 19. Under these conditions, when a further rise in hydraulic pressure in the first pressure chamber P1 occurs, the piston 7 is greatly displaced, downward and thus the top end face 40a of the second pin 40 is brought into abutted-engagement with the piston head on the other end of piston 7 and then the second valve element 37 together with the second pin 40 is pushed or thrust in the direction of displacement of piston 7. Hence, the tip 37c of the second valve element moves apart from the second seat member 46. As a result of this, fluid-communication between the first pressure chamber P1 and the second pressure chamber P2 becomes established, and thus working oil in the first pressure chamber P1 is discharged into the second pressure chamber P2. Accordingly, the hydraulic pressure in the first pressure chamber P1 drops, thereby suppressing an excessive rise in hydraulic pressure in the first pressure chamber P1.

In this manner, in the integral power steering device 1, the first valve 18 and the second valve 19, each serving as a stroke limiter, are provided to limit both an excessive hydraulic pressure rise in the first pressure chamber P1 and an excessive hydraulic pressure rise in the second pressure chamber P2, thereby permitting the motion transmitter, i.e., the motion converters and the like to be protected.

By the way, the position of abutment of each of the first pin 26 and the second pin 40 with the piston 7 is set as follows:

That is to say, under a specific state disconnected from the pump, the top end face 26a of the first pin 26 and the top end face 40a of the second pin 40 are both protruded toward the side of the piston 7 in advance sufficiently greater amount as compared to an appropriate protrusion amount. Thereafter, the abutment-position setting can be made by bringing the piston 7 into abutted-engagement with the top end face 26a (the top end face 40a) by operating the steering wheel, and by pushing the first pin 26 (the second pin 40) into the through, holes 29 (the through holes 45). In this manner, it is possible to easily but certainly perform the positional adjustment work of the first pin 26 (the second pin 40) for bringing the first valve 18 (the second valve 19) into an operative state.

As discussed above, in the integral power steering device 1 of the shown embodiment, the first valve 18, which is disposed on the side of valve housing 4, is configured or provided directly in the valve housing 4 without any case member ouch as valve case 35. Hence, it is possible to reduce the maximum diameter t1 of the first valve accommodation hole 21 by the radial thickness of the valve main body, as compared to the prior-art device in which the valve on the side of the valve housing is installed through the use of the valve main body corresponding to the valve case 35, that is, the valve main body and the valve element are configured to be overlapped with each other in the radial direction.

Hence, it is possible to arrange the first valve accommodation hole 21 in close proximity to the side of rotary valve 17. As a result of this, it is possible to downsize the valve housing 4 and accordingly it is possible to downsize the housing main body 3 owing to the downsized valve housing 4.

In contrast to the above, regarding part of the housing without the rotary valve 17, for instance, regarding the bottom 2c, it is possible to improve the efficiency of assembling work by installing the pre-unitized second valve 19 in the bottom.

Additionally, the first valve accommodation hole 21 is formed in the valve housing 4 and configured and arranged substantially parallel to the axis of the steering shaft 5. Hence, it is possible to reduce the area occupied by the first valve accommodation hole 21 in the radial direction of the valve housing 4, as compared to the prior-art device in which the through hole corresponding to the first valve accommodation hole 21 is formed obliquely with respect to the axle of the steering shaft. In this respect, it is possible to arrange the first valve accommodation hole 21 in close proximity to the side of rotary valve 17. As a result of this, it is possible to reduce the radial size of the valve housing 4.

Furthermore, in the shown embodiment, by virtue of arrangement of the first valve accommodation hole 21 substantially parallel to the axis of the steering shaft 5, the direction of movement of the first pin 26 approximately coincides with the direction of movement of piston 7. Hence, it is possible to reduce the load acting on the first pin 26 and consequently improve the durability of the first pin 26, as compared to the prior-art device in which the direction of movement of the pin and the direction of movement of the piston differ from each other.

Also, the first seat member 31 is configured to abut on the stepped portion 21a provided directly in the valve housing 4. Hence, it is possible to prevent the first valve seat member 24 from falling out of the first valve accommodation hole owing to hydraulic pressure in the second pressure chamber, thus suppressing an undesirable displacement of the first valve seat member 24, as compared to the prior-art device in which the valve seat member is fixedly connected to the valve main body by caulking. Therefore, it is possible to support the first pin 26 in a more stable attitude.

Furthermore, the center of the top end face 26a of the first pin 26 is set or configured to abut on the piston head of piston 7. Hence, the force, applied from the piston 7 and acting on the first pin 26, can be received by the whole of the first pin 26 and dispersed, thus more greatly improving the durability of the first pin.

Also, the sealing plug 22 is configured to have the large-diameter portion 22a exposed to the outside of the valve housing 4. The large-diameter portion 22a has the engaging portion 22c, which is recessed in the outside end face of the large-diameter portion, and with which a tool for attaching or detaching the sealing plug 22 is brought into engagement. Hence, it is possible to ensure the engaging portion 22c adapted to engage with the tool, while suppressing enlargement of the whole of the first large-diameter portion 27. Additionally, it is possible to avoid the interference between the tool and the input shaft 9 by forming the engaging portion 22c in the outside end face of the large-diameter portion 22a rather than forming the engaging portion 22c in the outer peripheral surface of the large-diameter portion 22a.

Also, in the shown embodiment, the inside end of valve housing 4 is configured as the reduced-diameter fitting protrusion 4b, whereas the opening end of gear housing 2 is configured as the enlarged-diameter fitting recess 2d in which the fitting protrusion is received. By recess-and-protrusion fitting of the fitting protrusion 4b and the fitting recess 2d, both the housings 2, 4 are configured to be overlapped with each other in the axial direction. Hence, it is possible to reduce the outside diameter of the opening end of gear housing 2 by such dimension as to permit the housings 2, 4 to be axially overlapped with each other, as compared to the prior-art device in which both the housings are configured to be overlapped with each other only in the radial direction. Accordingly, it is possible to more greatly reduce the sire of the gear housing 2.

Second Embodiment

Figure 6:
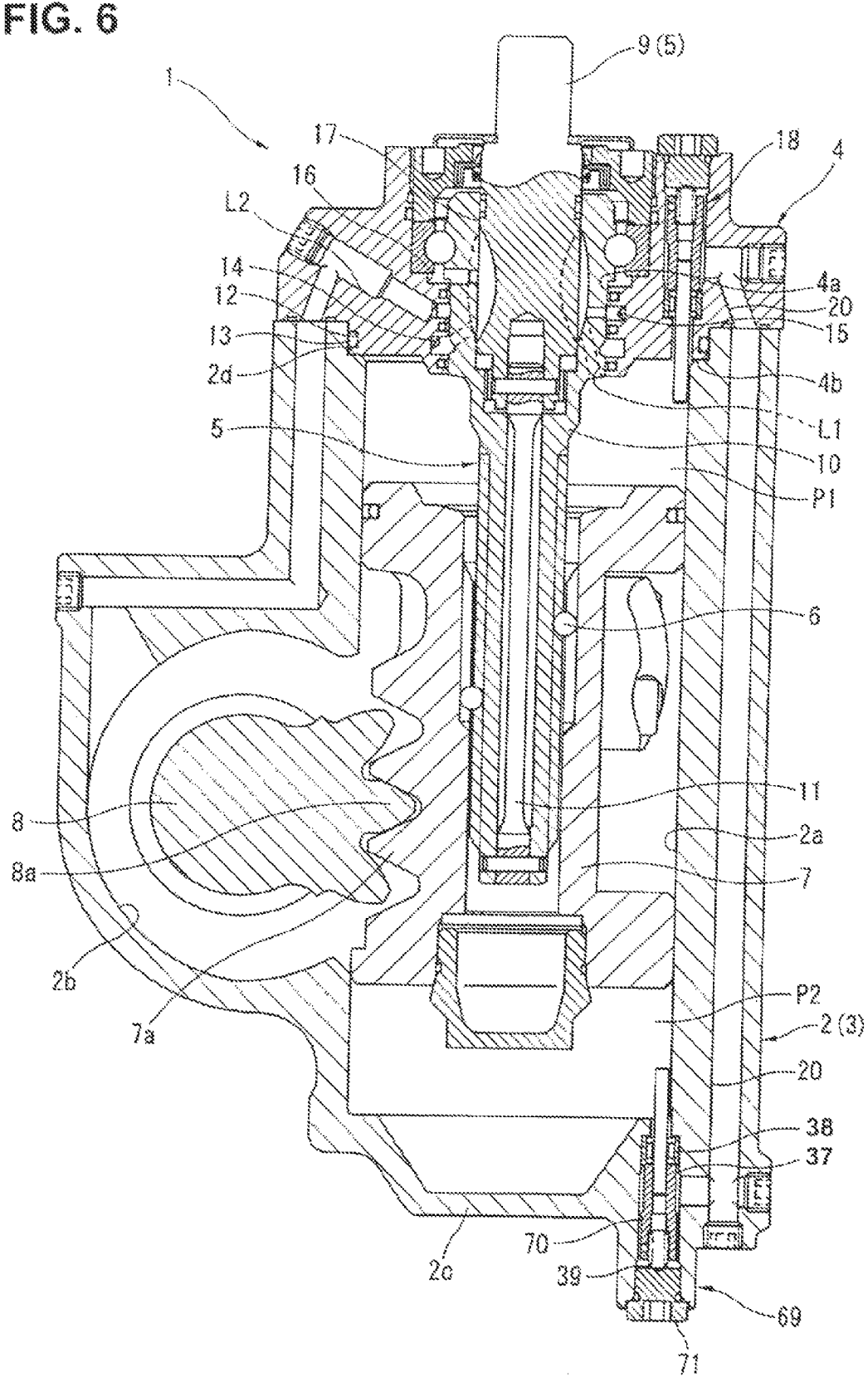
FIG. 6 is a longitudinal cross-sectional view illustrating a second embodiment of an integral power steering device according to the invention.

Referring to FIG. 6, there is shown the second embodiment of the invention. The fundamental construction of the second embodiment is similar to the first embodiment but differs from the first embodiment in that only the structure of a second valve 69 is changed. In hereunder explaining the second embodiment, only the different construction is explained, that is, the same reference signs used to designate elements in the first embodiment shown in FIG. 1 will be applied to the corresponding elements used in the second embodiment, while detailed description of the same reference signs will be omitted because the above description thereon seems to be self-explanatory.

In the second embodiment, the second valve 69 has the same configuration as the first valve 18 of the device according to the first embodiment. That is, without any case member such as valve case 35 used in the first embodiment, a second valve accommodation hole 70 is formed or bored in the bottom 2c itself, and the second valve seat member 38 and the second valve element 37 are directly disposed in the second valve accommodation hole 70. The second valve accommodation hole 70 is plugged or hermetically sealed by means of a sealing plug 71 having the same configuration as the plug of the first valve 18.

Therefore, the second embodiment can provide the same effects as the first embodiment. Additionally, forming the second valve accommodation hole 70 in the bottom 2c itself eliminates the need for the valve case 35. This contributes to reduced number of parts, thus attaining lower manufacturing costs of the device.

Reference Examples

Figure 7:
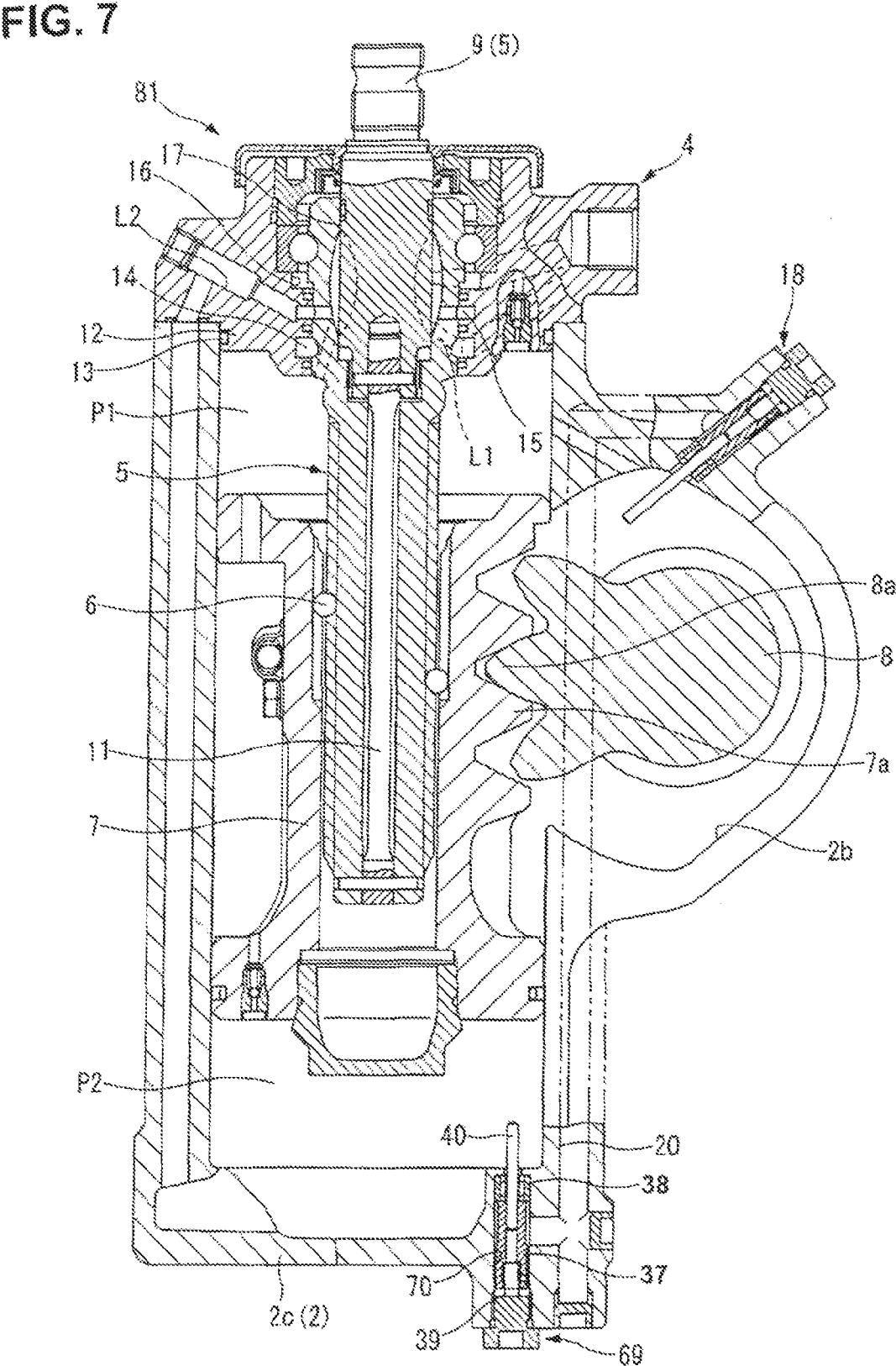
FIG. 7 is a cross-sectional view illustrating a reference example in which the inventive concept is applied to an integral power steering device having a different valve layout.
Figure 8:
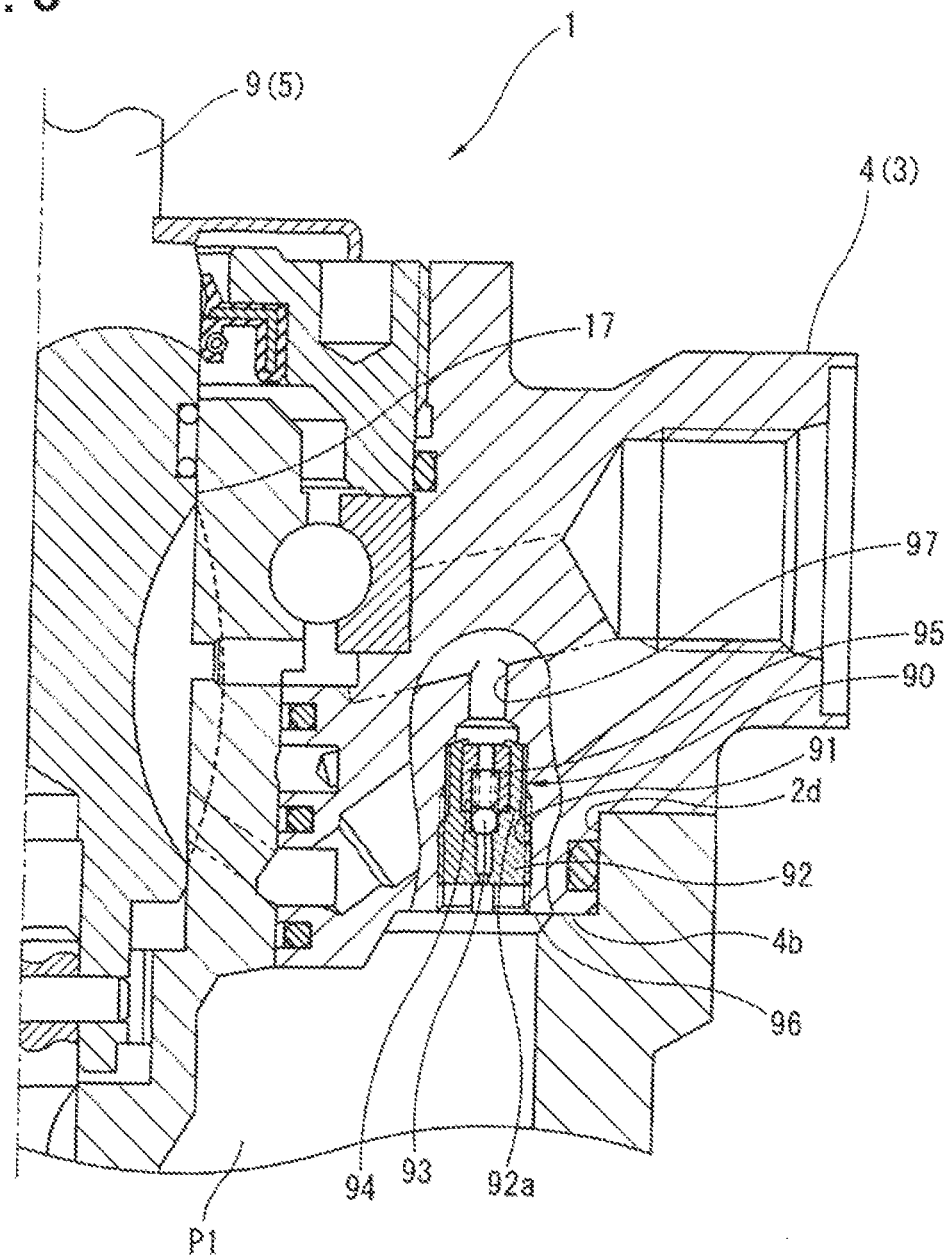
FIG. 8 is a cross-sectional view illustrating a reference example in which the inventive valve configuration is applied to an air bleeder.

Referring to FIGS. 7-8, there are shown reference examples to which the inventive concept can be assumed to be applied.

In an integral power steering device 81 of FIG. 7, the first valve 18 is installed or disposed in the peripheral wall of the sector gear accommodation section 2b. By the way, the fundamental construction of the reference example in this figure is similar to the first embodiment. Therefore, the same reference signs used to designate elements in the first embodiment will be applied to the corresponding elements used in the reference example, while detailed description of the same reference signs will be omitted.

That is, the technical idea of the invention that the valve element of the first valve 18 is accommodated and disposed directly in the housing main body can be applied to any place other than the valve housing in which the first valve 18 is provided, thereby attaining lower manufacturing costs of the device.

FIG. 8 shows the cross section of the integral power steering device 1 of FIG. 1, cut at a different angular position in the circumferential direction. As seen from FIG. 8, also provided is an air bleeder 90 configured to open into a recessed portion 96 (described later) formed in the circumference of the fitting protrusion 4b of valve housing 4, for bleeding air out of the first pressure chamber P1. By the way, other configurations are similar to the device of FIG. 1. Therefore, the same reference signs used to designate elements in the first embodiment will be applied to the corresponding elements used in the reference example, while detailed description of the same reference signs will be omitted.

Briefly speaking, the air bleeder 90 is a ball check valve. The air bleeder is comprised of a valve accommodation hole 91, a substantially cylindrical valve body 92, a ball 93, a retainer member 94, and a coil spring 95. The valve accommodation hole 91 is bored in the valve housing 4 itself. The valve body 92 is screwed into the valve accommodation hole 91. The ball 93 is accommodated and disposed in the inner peripheral side of the valve body 92. The retainer member 34 is fixedly connected to the axial end of the inner periphery of the tip of the valve body 92 by caulking. The coil spring 93 is interposed between the retainer member 94 and the ball 93 for biasing the ball against a valve seat 92a formed on the inner periphery of the axial midpoint of the valve body.

The operation of the air bleeder 90 is hereunder described. First, air (air bubbles), mixed with working oil in each of pressure chambers P1, P2, tends to be accumulated in the recessed portion 96 formed and recessed in the circumference of the upper end of the first pressure chamber P1. Hence, when the hydraulic pressure in the first pressure chamber P1 exceeds a predetermined pressure value, the ball 93 lifts up and becomes open under the hydraulic pressure. The air bubbles, together with working oil, flow into a fluid passage 97, and thus the air bubbles are exhausted into a reservoir tank (not shown).

In this manner, the technical idea of the invention that the valve element is accommodated and disposed directly in the housing can be applied to a variety of check valves such as the previously-noted air bleeder 90, as well as the stroke limiter (the first valve 18 or the second valve 19) as set out above in reference to the embodiments shown and described herein.

The other technical ideas grasped from the embodiments shown and described are enumerated and explained, as follows:

[a] The integral power steering device as recited previously, is characterized in that a coil spring, which serves as the first biasing member, is interposed such that one axial end of the coil spring abuts on the sealing member and that the other axial end abuts on the first valve element.

According to the above invention, the sealing member provides a sealing function for the first valve accommodation hole, and also serves as a seating surface for the coil spring. This contributes to reduced number of parts, thus attaining lower manufacturing costs of the device.

[b] The integral power steering device as recited in the item a, is characterized in that the sealing member comprises a small-diameter portion placed into the first valve accommodation hole and a large-diameter portion having an outside diameter dimensioned greater than the small-diameter portion and placed on an outside of the first valve accommodation hole so as to be exposed to the outside, the large-diameter portion being adapted to have an engaging portion with which a tool for installing the sealing member is brought into engagement.

According to the above invention, the engaging portion, which requires a prescribed size or dimension for engaging with the tool, is placed outside of the first valve accommodation hole so as to be exposed to the outside, such that a part of the sealing member, accommodated in the first valve accommodation hole, is configured as a small-diameter portion. Hence, it is possible to ensure the engaging portion adapted to engage with the tool, while suppressing enlargement of the first valve accommodation hole.

[c] The integral power steering device as recited in the item b, is characterized in that the engaging portion of the sealing member adapted to engage with the tool is recessed substantially in a radial center of an outside end face of the large-diameter portion of the sealing member.

According to the above invention, the engaging portion adapted to engage with the tool is recessed in the outside end face of the large diameter portion of the sealing member. Hence, it is possible to avoid the interference between the tool and the steering shaft and the like by forming the engaging portion in the outside end face rather than forming the engaging portion adapted to engage with the tool in the outer peripheral surface of the large-diameter portion. This contributes to the improved assembling workability.

[d] The integral power steering device as recited previously, is characterized in that a substantially center of a top end face of a first one of two opposite longitudinal ends of the first pin portion is brought into abutted-engagement with the piston.

According to the above invention, the substantially center of the top end face of the first pin portion is brought into abutted-engagement with the piston. Hence, the force, applied from the piston and acting on the first pin portion, can be dispersed, thus suppressing the first pin from being deformed.

[e] The integral power steering device as recited previously, is characterized in that the first valve element comprises a large-diameter portion slidably fitted, on an inner peripheral surface of the first valve accommodation hole and a small-diameter portion configured on a side of the valve seat portion with respect to the large-diameter portion and having an outside diameter set less than the large-diameter portion.

According to the above invention, an annular flow path (a clearance space) is defined between the outer peripheral surface of the small-diameter portion and the inner peripheral surface of the first valve accommodation hole. Hence, it is possible to ensure the flow path through which working oil flows only by the first valve element, while suppressing the first valve element from falling down or inclining.

[f] The integral power steering device as recited previously, is characterized in that the first valve element has a through hole to which a second one of two opposite longitudinal ends of the first pin portion is press-fitted and fixed; and the first pin portion is press-fitted and fixed to the through hole by pushing a first one of the two opposite longitudinal ends by the piston during non-operation of a hydraulic pressure source.

According to the above invention, it is possible to easily but certainly perform the positional adjustment work of the first pin portion.

[g] The integral power steering device according to another aspect of the invention, is characterized in that the first valve accommodation hole comprises a large-diameter portion in which the first valve element is accommodated, and a small-diameter portion whose diameter is reduced from an end of the large-diameter portion, facing the first pressure chamber, and in which the first pin portion is inserted; and the first valve seat portion is formed into a cylindrical shape, one end of the first valve seat portion being configured to abut on a stepped portion defined, by a border between the large-diameter portion and the small-diameter portion.

According to the above invention, it is possible to suppress an undesirable displacement of the valve seat portion, as compared to the prior-art device in which the valve seat portion is fixedly connected to the valve main body by caulking.

[h] The integral power steering device as recited in the item g, is characterized in that the first valve accommodation hole is formed by machining from a side of the large-diameter portion; and an outside opening end of the large-diameter portion is hermetically plugged by the sealing member.

According to the above invention, it is possible to easily form the stepped portion of the first valve accommodation hole between the large-diameter portion and the small-diameter portion.

[i] The integral power steering device as recited in the item h, is characterized in that a coil spring, which serves as the first biasing member, is interposed such that one axial end of the coil spring abuts on the sealing member and that the other axial end abuts on the first valve element.

According to the above invention, the sealing member provides a sealing function for the first valve accommodation hole, and also serves as a seating surface for the coil spring. This contributes to reduced number of parts, thus attaining lower manufacturing costs of the device.

[j] The integral power steering device as recited in the item i, is characterized in that the sealing member comprises a small-diameter portion placed into the first valve accommodation hole and a large-diameter portion having an outside diameter dimensioned greater than, the small-diameter portion and placed on an outside of the first valve accommodation hole so as to be exposed to the outside, the large-diameter portion being adapted to have an engaging portion with which a tool for installing the sealing member is brought into engagement.

According to the above invention, the engaging portion, which requires a prescribed size or dimension for engaging with the tool, is placed outside of the first valve accommodation hole so as to be exposed to the outside, such that a part of the sealing member, accommodated in the first valve accommodation hole, is configured as a small-diameter portion. Hence, it is possible to ensure the engaging portion adapted to engage with the tool, while suppressing enlargement of the first valve accommodation hole.

[k] The integral power steering device as recited in the item j, is characterized in that the engaging portion of the sealing member adapted to engage with the tool is recessed substantially in a radial center of an outside end face of the large-diameter portion of the sealing member.

According to the above invention, the engaging portion adapted to engage with the tool is recessed in the outside end face of the large-diameter portion of the sealing member. Hence, it is possible to avoid the interference between the tool and the steering shaft and the like by forming the engaging portion, in the outside end face rather than forming the engaging portion adapted to engage with the tool in the outer peripheral surface of the large-diameter portion. This contributes to the improved assembling workability.

[l] The integral power steering device according to another aspect of the invention, is characterized in that a substantially center of a top end face of a first one of two opposite longitudinal ends of the first pin portion is brought into abutted-engagement with the piston.

According to the above invention, the substantially center of the top end face of the first pin portion is brought into abutted-engagement with the piston. Hence, the force, applied from the piston and acting on the first pin portion, can be dispersed, thus suppressing the first pin from being deformed.

[m] The integral power steering device according to another aspect of the invention, is characterized in that the valve housing is formed at an opposite end facing the gear housing with a reduced-diameter fitting protrusion configured to protrude toward the gear housing; and the gear housing is formed at the opening end with an enlarged-diameter fitting recess configured to receive the fitting protrusion.

According to the above invention, at the opening end of the gear housing, the valve housing and the gear housing are configured to be overlapped with each other in the axial direction. Hence, it is possible to reduce the outside diameter of the opening end of the gear housing by such dimension as to permit the housings to be axially overlapped with each other, as compared to the prior-art device in which the valve housing and the gear housing are configured to be overlapped with each other only in the radial direction. As a result of this, it is possible to more greatly reduce the size of the gear housing.

[n] The integral power steering device according to another aspect of the invention, is characterized in that the first valve element comprises a large-diameter portion slidably fitted on an inner peripheral surface of the first valve accommodation hole and a small-diameter portion configured on a side of the valve seat portion with respect to the large-diameter portion and having an outside diameter set less than the large-diameter portion.

According to the above invention, an annular flow path (a clearance space) is defined between the outer peripheral surface of the small-diameter portion and the inner peripheral surface of the first valve accommodation hole. Hence, it is possible to ensure the flow path through which working oil flows only by the first valve element, while suppressing the first valve element from falling down or inclining.

[o] The integral power steering device according to another aspect of the invention, is characterized in that the first valve element has a through hole to which a second one of two opposite longitudinal ends of the first pin portion is press-fitted and fixed; and the first pin portion is press-fitted and fixed to the through hole by pushing a first one of the two opposite longitudinal ends by the piston during non-operation of a hydraulic pressure source.

According to the above invention, it is possible to easily but certainly perform the positional adjustment work of the first pin portion.

REFERENCE SIGNS LIST

1 Integral power steering device
2 Gear housing
2a Cylinder section
2d Fitting recess
3 Housing main body (Housing)
4 Valve housing
4a Rotary valve accommodation portion (Shaft insertion hole)
4b Fitting protrusion
5 Steering shaft
6 Ball-screw mechanism
7 Piston
7a Rack gear (Toothed portion, 2nd motion converter)
8a sector gear (2nd motion converter)
9 Stub shaft (Input shaft)
17 Rotary valve
18 First valve
19 Second valve
21 First valve accommodation hole
21a Stepped portion
22 Sealing plug
23 First valve element
24 First valve seat member (First valve seat portion)
25 First compression coil spring (First biasing member)
26 First pin (First pin portion)
27 First large-diameter portion (Large-diameter portion)
28 First small-diameter portion (Small-diameter portion)
32 Guide hole (First pin insertion hole)
P1 First pressure chamber
P2 Second pressure chamber

The invention claimed is:
1. An integral power steering device comprising:
a housing constructed by a gear housing formed of a metallic material and configured to be closed at one axial end and to have an opening at the other axial end, and a valve housing formed of a metallic material and configured to close the opening end of the gear housing and to have a shaft insertion hole axially formed through the valve housing;
a steering shaft adapted to be linked at one end to a steering wheel, the other end of the steering shaft being configured to be inserted into the valve housing so as to face an internal space of the gear housing;
a piston linked to the other end of the steering shaft and configured to partition the internal space of the gear housing into a first pressure chamber and a second pressure chamber;
a first motion converter interposed between the steering shaft and the piston for converting rotary motion of the steering shaft into axial movement of the piston;
a second motion converter configured to be meshed-engagement with a toothed portion formed on an outer periphery of the piston for converting the axial movement of the piston into rotary motion for turning;
a rotary valve provided to be linked to the steering shaft in the shaft insertion hole and adapted to selectively introduce working oil supplied from an external hydraulic pressure source to either of the first pressure chamber and the second pressure chamber depending on a rotation direction of the steering shaft;
a first valve disposed in the valve housing and configured to discharge hydraulic pressure in the second pressure chamber into the first pressure chamber when the piston has reached a first predetermined stroke position at which a volume of the first pressure chamber becomes a minimum permissible capacity by a movement of the piston; and
a second valve disposed in the gear housing and configured to discharge hydraulic pressure in the first pressure chamber into the second pressure chamber when the piston has reached a second predetermined stroke position at which a volume of the second pressure chamber becomes a minimum permissible capacity by a movement of the piston,
wherein at least the first valve comprises:
a first valve accommodation hole formed by machining the valve housing itself;
a first valve seat portion disposed in the first valve accommodation hole and arranged on a side of the first pressure chamber and having a first pin insertion hole axially formed through the first valve seat portion;
a first valve element arranged to be opposed to the first valve seat portion and installed to axially slide in the first valve accommodation hole and configured to cut off a movement of working oil from the second pressure chamber to the first pressure chamber with the first valve element seated on the first valve seat portion;
a first pin portion integrally connected to the first valve element and configured to face an internal space of the first pressure chamber through the first pin insertion hole and to apply a moving force to the first valve element by pushing the first pin portion by the piston immediately when the first predetermined stroke position of the piston has been reached; and a first biasing member configured to bias the first valve element toward the first valve seat portion.

2. The integral power steering device as recited in claim 1, wherein:
the first valve accommodation hole comprises a large-diameter portion in which the first valve element is accommodated, and a small-diameter portion whose diameter is reduced from an end of the large-diameter portion, facing the first pressure chamber, and in which the first pin portion is inserted; and
the first valve seat portion is formed into a cylindrical shape, one end of the first valve seat portion being configured to abut on a stepped portion defined by a border between the large-diameter portion and the small-diameter portion.

3. The integral power steering device as recited in claim 2, wherein:
the first valve accommodation hole is formed by machining from a side of the large-diameter portion; and
an outside opening end of the large-diameter portion is hermetically plugged by a sealing member.

4. The integral power steering device as recited in claim 3, wherein:
a coil spring, which serves as the first biasing member, is interposed such that one axial end of the coil spring abuts on the sealing member and that the other axial end abuts on the first valve element.

5. The integral power steering device as recited in claim 4, wherein:
the sealing member comprises a small-diameter portion placed into the first valve accommodation hole and a large-diameter portion having an outside diameter dimensioned greater than the small-diameter portion and placed on an outside of the first valve accommodation hole so as to be exposed to the outside, the large-diameter portion being adapted to have an engaging portion with which a tool for installing the sealing member is brought into engagement.

6. The integral power steering device as recited in claim 5, wherein:
the engaging portion of the scaling member adapted to engage with the tool is recessed substantially in a radial center of an outside end lace of the large-diameter portion of the sealing member.

7. The integral power steering device as recited in claim 1, wherein:
a substantially center of a top end face of a first one of two opposite longitudinal ends of the first pin portion is brought into abutted-engagement with the piston.

8. The integral power steering device as recited in claim 1, wherein:
the valve housing is formed at an opposite end facing the gear housing with a reduced-diameter fitting protrusion configured to protrude toward the gear housing; and
the gear housing is formed at the opening end with an enlarged-diameter fitting recess configured to receive the fitting protrusion.

9. The integral power steering device as recited in claim 1, wherein:
the first valve element comprises a large-diameter portion slidably fitted on an inner peripheral surface of the first valve accommodation hole and a small-diameter portion the first valve sent portion configured on a side of the first valve seat portion with respect to the large-diameter portion and having an outside diameter set less than the large-diameter portion.

10. The integral power steering device as recited in claim 1, wherein:
the first valve element has a through hole to which a second one of two opposite longitudinal ends of the first pin portion is press-fitted and fixed; and
the first pin portion is press-fitted and fixed to the through hole by pushing a first one of the two opposite longitudinal ends by the piston during non-operation of a hydraulic pressure source.

11. An integral power steering device comprising:
a housing constructed by a gear housing formed of a metallic material and configured to be closed at one axial end and to have an opening at the other axial end, and a valve housing formed of a metallic material and configured to close the opening end of the gear housing and to have a shaft insertion hole axially formed through the valve housing;
a steering shaft adapted to be linked at one end to a steering wheel, the other end of the steering shaft being configured to be inserted into the valve housing so as to face an internal space of the gear housing;
a piston linked to the other end of the steering shaft and configured to partition the internal space of the gear housing into a first pressure chamber and a second pressure chamber;
a first motion converter interposed between the steering shaft and the piston for converting rotary motion of the steering shaft into axial movement of the piston;
a second motion converter configured to be meshed-engagement with a toothed portion formed on an outer periphery of the piston for converting the axial movement of the piston into rotary motion for turning;
a rotary valve provided to be linked to the steering shaft in the shaft insertion hole and adapted to selectively introduce working oil supplied from an external hydraulic pressure source to either of the first pressure chamber and the second pressure chamber depending on a rotation direction of the steering shaft;
a first valve disposed in the valve housing and configured to discharge hydraulic pressure in the second pressure chamber into the first pressure chamber when the piston has reached a first predetermined stroke position at which a volume of the first pressure chamber becomes a minimum permissible capacity by a movement of the piston; and
a second valve disposed in the gear housing and configured to discharge hydraulic pressure in the first pressure chamber into the second pressure chamber when the piston has reached a second predetermined stroke position at which a volume of the second pressure chamber becomes a minimum permissible capacity by a movement of the piston,
wherein at least the first valve comprises:
a first valve accommodation hole provided in the valve housing and configured to be substantially conformable to a direction of movement of the piston;
a first valve seat portion disposed in the first valve accommodation hole and arranged on a side of the first pressure chamber and having a first pin insertion hole axially formed through the first valve seat portion;
a first valve element arranged to be opposed to the first valve seat portion and installed to axially slide in the first valve accommodation hole and configured to cut off a movement of working oil from the second pressure chamber to the first pressure chamber with the first valve element seated on the first valve seat portion;

a first pin portion integrally connected to the first valve element and configured to face an internal space of the first pressure chamber through the first pin insertion hole and to apply a moving force to the first valve element by pushing the first pin portion by the piston immediately when the first predetermined stroke position of the piston has been reached; and a first biasing member configured to bias the first valve element toward the first valve seat portion.

12. The integral power steering device as recited in claim 11, wherein:

the first valve accommodation hole comprises a large-diameter portion in which the first valve element is accommodated, and a small-diameter portion whose diameter is reduced from an end of the large-diameter portion, facing the first pressure chamber, and in which the first pin portion is inserted; and the first valve seat portion is formed into a cylindrical shape, one end of the first valve seat portion being configured to abut on a stepped portion defined by a border between the large-diameter portion and the small-diameter portion.

13. The integral power steering device as recited in claim 12, wherein:

the first valve accommodation hole is formed by machining from a side of the large-diameter portion; and an outside opening end of the large-diameter portion is hermetically plugged by a sealing member.

14. The integral power steering device as recited in claim 13, wherein:

a coil spring, which serves as the first biasing member, is interposed such that one axial end of the coil spring abuts on the sealing member and that the other axial end abuts on the first valve element.

15. The integral power steering device as recited in claim 14, wherein:

the sealing member comprises a small-diameter portion placed into the first valve accommodation hole and a large-diameter portion having an outside diameter dimensioned greater than the small-diameter portion and placed on an outside of the first valve accommodation hole so as to be exposed to the outside, the large-diameter portion being adapted to have an engaging portion with which a tool for installing the sealing member is brought into engagement.

16. The integral power steering device as recited in claim 15, wherein:

the engaging portion of the sealing member adapted to engage with the tool is recessed substantially in a radial center of an outside end face of the large-diameter portion of the sealing member.

17. The integral power steering device as recited in claim 11, wherein:

a substantially center of a top end face of a first one of two opposite longitudinal ends of the first pin portion is brought into abutted-engagement with the piston.

18. The integral power steering device as recited in claim 11, wherein:

the valve housing is formed at an opposite end facing the gear housing with a reduced-diameter fitting protrusion configured to protrude toward the gear housing; and the gear housing is formed at the opening end with an enlarged-diameter fitting recess configured to receive the fitting protrusion.

19. The integral power steering device as recited in claim 11, wherein:

the first valve element comprises a large-diameter portion slidably fitted on an inner peripheral surface of the first valve accommodation hole and a small-diameter portion configured on a side of the first valve seat portion with respect to the large-diameter portion and having an outside diameter set less than the large-diameter portion.

20. The integral power steering device as recited in claim 11, wherein:

the first valve element has a through hole to which a second one of two opposite longitudinal ends of the first pin portion is press-fitted and fixed; and the first pin portion is press-fitted and fixed to the through hole by pushing a first one of the two opposite longitudinal ends by the piston during non-operation of a hydraulic pressure source.

* * * * *